Sept. 25, 1945.  W. WENTHE  2,385,559
SERVICE TRUCK
Filed June 26, 1944  2 Sheets-Sheet 1
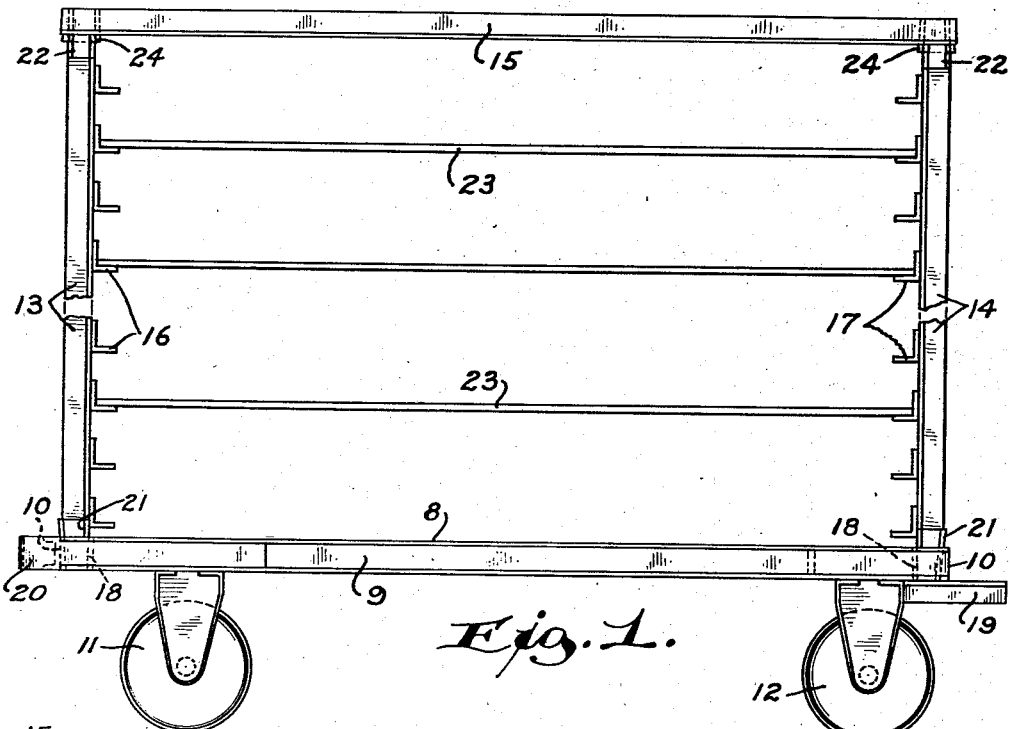
Fig. 1.
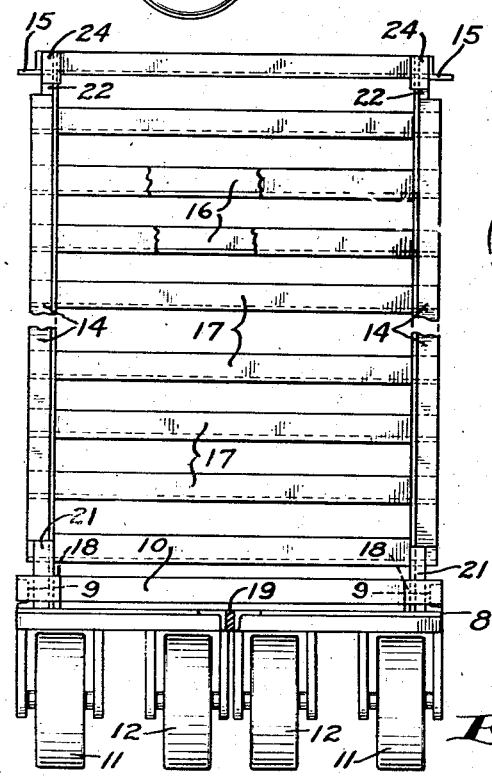
Fig. 2.
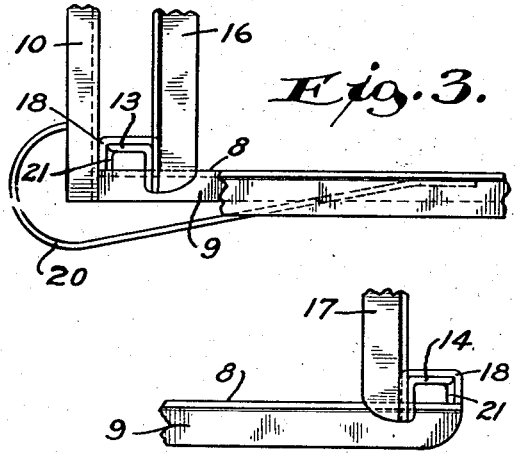
Fig. 3.
Fig. 4.
INVENTOR.
William Wenthe
BY
Lieber & Lieber
ATTORNEYS.

Sept. 25, 1945.   W. WENTHE   2,385,559
SERVICE TRUCK
Filed June 26, 1944   2 Sheets-Sheet 2
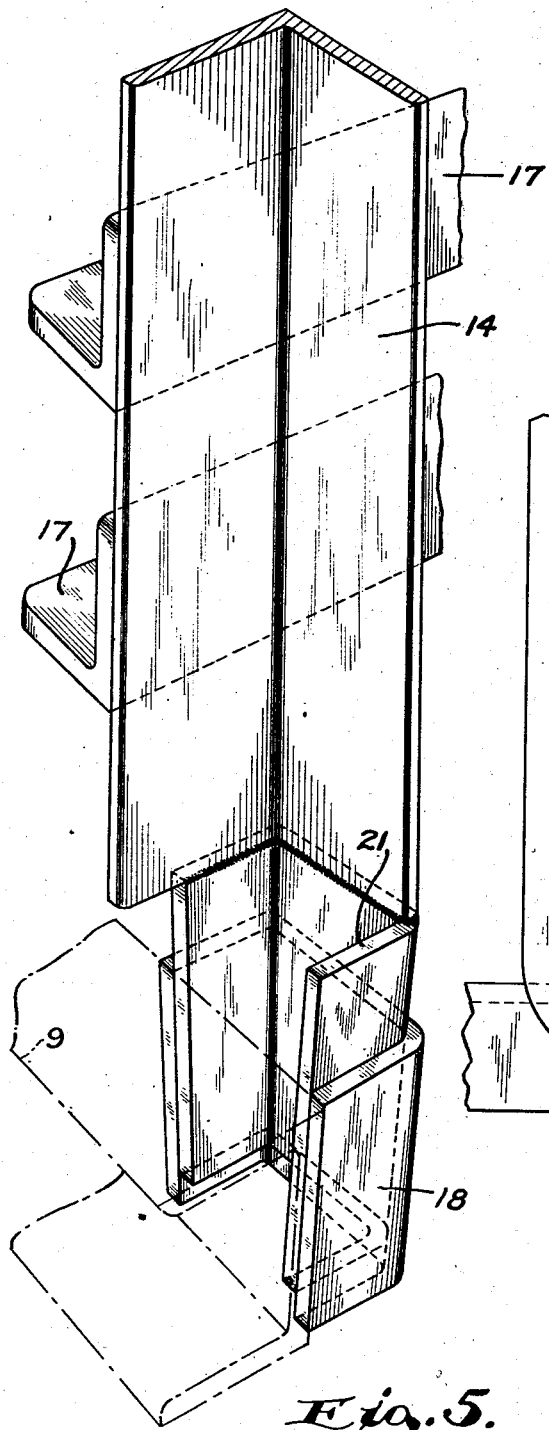
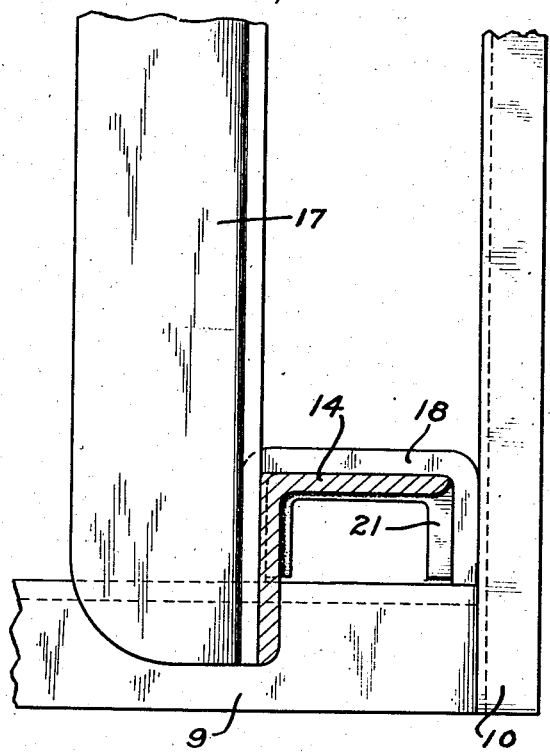
INVENTOR.
William Wenthe
BY
Lieber & Lieber
ATTORNEYS Patented Sept. 25, 1945

2,385,559

UNITED STATES PATENT OFFICE 2,385,559

SERVICE TRUCK

William Wenthe, Milwaukee, Wis., assignor to Wenthe-Davidson Engineering Co., Milwaukee, Wis., a corporation of Wisconsin Application June 26 1944, Serial No. 542,223

2 Claims. (Cl. 211—177)

This invention relates in general to improvements in service trucks, and relates more specifically to various improvements in the construction and operation of knock-down stock room trucks adapted for the transportation and storage of diverse articles.

The primary object of my present invention is to provide an improved stock room truck which is simple and durable in construction, which may be conveniently shifted from place to place, and which may be readily dismantled so as to occupy minimum space for shipment.

Some of the more important specific objects of the invention are as follows:

To provide an improved knock-down industrial service truck which may be quickly and readily assembled or dismantled, and which when assembled constitutes a sturdy stock room assemblage capable of being transferred from one position to another with very little effort.

To provide an improved service truck superstructure comprising relatively few parts which may be conveniently assembled with the aid of a hammer, to produce a firm support for numerous diverse articles, and which may be likewise dismantled and stacked so as to occupy only a fraction of the assembled space.

To provide an improved manually transportable stock room on wheels the various parts of which are durable in construction, like parts of which are interchangeably similar, and which is extremely flexible in its adaptations.

To provide a new and useful service truck assembly which may be manufactured from standard structural metal stock at minimum cost and without the use of fastenings such as bolts, screws, rivets or the like.

To provide an improved wheeled truck especially adapted to support relatively heavy loads without damaging the floors or other surfaces over which it is transported, and which may be easily turned on short radii and otherwise manipulated.

To provide an improved mobile stock room storage unit of great capacity adapted for the reception of both large or small articles of diverse shapes, and wherein the stored articles are freely accessible and removable without disturbing adjacent articles.

These and other objects and advantages of the present improvement will be apparent from the following detailed description.

A clear conception of the various features constituting the improvement, and of the mode of constructing and of utilizing service trucks embodying the invention, may be had by referring to the drawings accompanying and forming a part of this specification wherein like reference characters designate the same or similar parts in the several views.

Fig. 1 is a side elevation of a typical industrial service truck built in accordance with the invention;

Fig. 2 is a front end view of the service truck of Fig. 1;

Fig. 3 is a fragmentary top view of one of the rear corners of the same truck, drawn to a somewhat larger scale;

Fig. 4 is a fragmentary top view of one of the front corners of the truck, drawn to the same scale as Fig. 3;

Fig. 5 is a greatly enlarged fragmentary perspective view of the lower portion of one of the corners of the truck superstructure; and Fig. 6 is a similarly enlarged transverse horizontal section through the same corner.

Although the invention has been shown and described herein as being advantageously applicable to industrial stock room units mounted upon wheels and which are manually transportable, it is not my intention to thereby unnecessarily restrict the utility of the improved features which may be more generally applicable to other types of trucks.

Referring to the drawings, the improved stock room unit shown therein, comprises in general, a main approximately rectangular truck platform or body 8 formed of opposite side channel irons 9, front and rear transverse beams 10, and any desired number of transverse re-enforcing members rigidly interconnecting the irons 9; rear and front wheels 11, 12 respectively upon which the body 8 is mounted for convenient transportation; rear and front upright corner posts 13, 14 respectively detachably secured to the corresponding corners of the lower frame 8; upper opposite side bars 15 having their rear and front ends detachably associated with the upper ends of the adjacent posts 13, 14; and shelf supporting transverse angle bars 16, 17 rigidly interconnecting the rear and front corner posts 13, 14 respectively.

The side channels 9 and end beams 10 of the lower horizontal frame or body 8 are preferably welded to each other at the four corners, and a downwardly tapered channel-shaped socket 18 is also rigidly attached as by welding to the channels 9 and beams 10 at each corner as clearly shown in Figs. 5 and 6. The rear supporting wheels 11 of the body 8 are preferably spaced far apart and are located relatively near to the rear corners, while the front wheels 12 are disposed closely adjacent to each other near the front central portion of the body 8. These front wheels 12 may in some cases be replaced by a single front caster wheel which is freely rotatable about a vertical axis, in a well known manner; and all of the wheels 11, 12 are preferably relatively wide as shown, in order to provide ample bearing surface. The truck frame or body 8 is also provided with a manipulating and guiding handle 19 as illustrated in Figs. 1 and 2; and the rear corners at least, are preferably provided with resilient bumpers 20 as shown in Fig. 3, for the purpose of protecting the corners. The body 8 may thus be rigidly constructed of standard metal bars welded together, and may also be conveniently shifted from place to place with the aid of the handle 19 cooperating with the wheels 11, 12 which provide substantially a three point support for effecting short turning of the mobile unit.

The front and rear upright corner posts 13, 14 may be formed of suitable lengths of standard angle iron, and each of these posts has a tapered end member or channel-shaped wedge 21 rigidly attached to its lower extremity as by welding, and adapted to be snugly slip-fitted into the adjacent tapered lower socket 18 as depicted in Figs. 5 and 6. The upper extremity of each corner post 13, 14 is also provided with a similar end member or channel-shaped wedge 22 rigidly attached thereto as by welding, but these upper wedges 22 are tapered reversely of the lower wedges 21. The two rear corner posts 13 are rigidly interconnected by means of the rear shelf supporting angle bars 16 which are welded to the posts 13; and the two front corner posts 14, are likewise rigidly united by means of the front shelf supporting angle bars 17 which are also welded to these posts. The corresponding angle bars 16, 17 of the front and rear assemblages, are preferably disposed parallel to and in horizontal alinement with each other, so as to permit ready insertion of one or more shelves 23 as in Fig. 1, and any desired number of these shelf supporting bars 16, 17 may be provided. The upper opposite side bars 15 may also be formed of standard angle or channel iron, and each of these bars 15 has an upwardly tapered channel sectioned socket 24 firmly attached to each of its opposite ends by welding. These sockets 24 are adapted to be snugly slip-fitted onto the adjacent upper wedges 22 of the corner posts 13, 14; and while the wedges 21, 22 normally frictionally coact with the adjacent sockets 18, 24 respectively, to provide a rigid assemblage, they may be readily dislodged from these sockets with the aid of a hammer or the like so as to permit convenient dismantling of the superstructure.

During normal use of the improved service truck, the unit may obviously be assembled or dismantled at will, and such assembling and dismantling may be readily accomplished without the use of special tools. During storage or shipment of the truck units, the upper side bars 15 are removed from the wedges 24 at the upper ends of the corner posts 13, 14, and the shelves 23 are likewise removed from the angle bars 16, 17. The front and rear end assemblages comprising the corner posts 13, 14 and the shelf supporting bars 16, 17, are also removed from the sockets 18 of the body 8, and all of these elements may thus be compactly packed for storage or shipment.

In order to assemble the service truck unit, it is only necessary to apply the lower wedges 21 of the corner posts 13, 14 to the sockets 18 of the mobile body 8, and to thereafter apply the sockets 24 of the upper side bars 15 to the upper wedges 22 of the posts 13, 14. This simple operation will provide a rigid shelf supporting superstructure onto which the shelves 23 may be subsequently slid from the side of the unit, and the assembled superstructure obviously has considerable capacity for the storage of diverse articles. The wedges 21, 22 cooperating with the reversely tapered sockets 18, 24 respectively, will maintain the structure in assembled condition by gravity, but these wedges may obviously be quickly and conveniently removed for dismantling of the structure by merely tapping the removable elements with a hammer or an iron bar. The multiplicity of transverse angle bars 16, 17 which interconnect the front and rear corner posts 13, 14, not only provide ample shelf supporting means, but also prevent side displacement of the corner posts, and the welded construction which is used throughout the assemblage, eliminates possible loosening of parts due to displacement of screws, bolts, rivets or other fastenings.

From the foregoing detailed description it will be apparent that the present invention provides an extremely simple, compact and durable service truck assemblage which can be most conveniently assembled or dismantled without the use of special tools and with minimum loss of time. The assemblage can obviously be manufactured at relatively low cost due to the use of standard commercial bar-sections throughout; and the angle and channel bars utilized in the structure provide an extremely strong and rigid storage unit. The provision of widely spaced rear wheels 11 and centrally located front wheels 12 enables the mobile unit to be readily manipulated and turned on short radii, and the use of the wide faced wheels 11, 12 also protects the floors over which the unit is transported. The improved service truck assemblage has proven highly satisfactory and successful in actual commercial use, and is obviously extremely flexible in its adaptations and can accommodate articles of various sizes and shapes within relatively limited space.

It should be understood that it is not desired to limit this invention to the exact details of construction or to the precise mode of use, herein shown and described, for various modifications within the scope of the appended claims may occur to persons skilled in the art.

I claim:

1. A service truck comprising, a portable rectangular platform having an upwardly enlarging tapered socket at each of its four corners, a rectangular frame located above said platform and having a downwardly enlarging tapered socket at each of its four corners disposed in vertical alinement with one of said platform sockets, each of said sockets consisting of a sheet-metal channel-shaped piece welded to the adjacent platform or frame, and two pairs of corner posts, each pair being connected by horizontal bars, and each post being formed of structural bar metal and having oppositely tapered channel-shaped sheet-metal wedges welded to the extreme opposite ends thereof and adapted to frictionally engage a complementary pair of alined sockets of said platform and frame.

2. A service truck comprising, a portable rectangular platform having an upwardly enlarging tapered socket at each of its four corners, a rectangular frame formed of metal angle bars and being located above said platform and having a downwardly enlarging tapered socket at each of its four corners disposed in vertical alinement with one of said platform sockets, said sockets being interchangeably similar and each consisting of a sheet-metal channel-shaped piece welded to the adjacent platform or frame, and two pairs of corner posts, each pair being connected by horizontal angle bars, and each post being formed of metal angle bar stock and having oppositely tapered channel-shaped sheet-metal wedges welded in axial alinement with the extreme opposite ends thereof and adapted to frictionally engage a complementary pair of alined sockets of said platform and frame.

WILLIAM WENTHE.